US008813414B2

(12) United States Patent
Jones et al.

(10) Patent No.: US 8,813,414 B2
(45) Date of Patent: Aug. 26, 2014

(54) SAFETY GAFF (75) Inventors: Todd A. Jones, La Mesa, CA (US); Albert Cascia, La Mesa, CA (US)

(73) Assignee: J. R. Jones Company, San Diego, CA (US)

( * ) Notice: Subject to any disclaimer, the term of this patent is extended or adjusted under 35 U.S.C. 154(b) by 881 days.

(21) Appl. No.: 12/281,471

(22) PCT Filed: Mar. 1, 2007

(86) PCT No.: PCT/US2007/063108
§ 371 (c)(1),
(2), (4) Date: Aug. 2, 2010

(87) PCT Pub. No.: WO2007/103752
PCT Pub. Date: Sep. 13, 2007

(65) Prior Publication Data
US 2011/0018290 A1    Jan. 27, 2011

Related U.S. Application Data (60) Provisional application No. 60/778,593, filed on Mar. 1, 2006.

(51) Int. Cl.
*A01K 97/14* (2006.01)
(52) U.S. Cl.
CPC .................................... *A01K 97/14* (2013.01)
USPC .................................... 43/5; 294/26; 294/175
(58) Field of Classification Search
USPC ........................ 43/5, 6; 294/26, 175
See application file for complete search history.

(56) References Cited

U.S. PATENT DOCUMENTS

| 453,776 | A | * | 6/1891 | McCory | 294/52 |
| 1,258,632 | A | * | 3/1918 | Harris | 43/12 |
| 1,596,631 | A | * | 8/1926 | Seibold | 294/26 |
| 2,112,765 | A | * | 3/1938 | Darling | 294/26 |
| 2,214,660 | A | * | 9/1940 | Darling | 294/26 |
| 2,461,941 | A | * | 2/1949 | Sutton | 294/26 |
| 2,463,706 | A | * | 3/1949 | Martineau | 294/26 |
| 2,496,822 | A | * | 2/1950 | Stoddard | 294/26 |
| 2,516,620 | A | * | 7/1950 | Darling | 294/26 |
| 2,547,273 | A | * | 4/1951 | Le Febvre et al. | 294/26 |
| 2,570,538 | A | * | 10/1951 | Fincher et al. | 294/26 |
| 2,570,688 | A | * | 10/1951 | Keegan | 294/26 |
| 2,575,986 | A | * | 11/1951 | Yoder | 294/26 |
| 2,725,253 | A | * | 11/1955 | Wallman | 294/26 |
| 3,287,845 | A | * | 11/1966 | Smith | 43/5 |

(Continued)

FOREIGN PATENT DOCUMENTS

| FR | 2840155 A1 | * | 12/2003 | A01K 97/14 |
| JP | 2000292249 A | * | 10/2000 | A01K 97/14 |

(Continued)

*Primary Examiner* — Darren W Ark
(74) *Attorney, Agent, or Firm* — Thomas J. Tighe, Esq.

(57) ABSTRACT

An elongated handle has a pointed fish hook rotatably affixed to one end of the handle, the hook having two operating dispositions, a first disposition wherein the hook is open for gaffing purposes and a second disposition wherein the hook folded back against the handle to block the hook point for safety. A mechanism releasably secures the hook at either disposition. A button actuated mechanism releases the hook from either disposition so that the hook can be moved from one operating disposition to the other. Preferably the gaff further includes a bias for urging the hook toward its open, gaffing disposition.

10 Claims, 12 Drawing Sheets

(56) References Cited

U.S. PATENT DOCUMENTS

| | | | | | |
|---|---|---|---|---|---|
| 3,803,742 | A | * | 4/1974 | Foster | 43/6 |
| 4,148,512 | A | * | 4/1979 | Pendlebury | 43/5 |
| 4,351,126 | A | * | 9/1982 | Simonson | 43/5 |
| 4,547,989 | A | * | 10/1985 | Karlsson | 43/5 |
| 4,590,700 | A | * | 5/1986 | Klein | 43/5 |
| 4,598,492 | A | * | 7/1986 | Stanfield | 43/5 |
| 4,645,253 | A | * | 2/1987 | Hogden et al. | 294/26 |
| 4,720,932 | A | * | 1/1988 | Bovino | 43/5 |
| 4,739,573 | A | * | 4/1988 | Robertson | 43/5 |
| 4,748,704 | A | * | 6/1988 | Houdek | 294/26 |
| 4,783,926 | A | * | 11/1988 | McKinney et al. | 43/5 |
| 4,845,876 | A | * | 7/1989 | Dodson | 43/5 |
| 4,885,862 | A | * | 12/1989 | Thayer | 43/6 |
| 4,934,089 | A | * | 6/1990 | Samar | 43/5 |
| 5,119,585 | A | * | 6/1992 | Camp | 43/5 |
| 5,365,688 | A | * | 11/1994 | Yong-Set | 43/5 |
| 5,704,156 | A | * | 1/1998 | DiLello | 43/5 |
| 5,832,651 | A | * | 11/1998 | Arntz | 43/5 |
| 6,079,141 | A | * | 6/2000 | Washecka | 43/5 |
| 6,363,876 | B1 | * | 4/2002 | Blake | 294/26 |
| 6,560,913 | B1 | * | 5/2003 | Liao | 43/5 |
| 6,766,609 | B1 | * | 7/2004 | Aboczky | 43/5 |
| 6,857,217 | B1 | * | 2/2005 | Herbst et al. | 43/5 |
| 6,943,304 | B1 | * | 9/2005 | Brady et al. | 43/5 |
| 6,989,495 | B2 | * | 1/2006 | Yang | 43/5 |
| 7,076,910 | B1 | * | 7/2006 | Xifra | 43/5 |
| 7,178,845 | B1 | * | 2/2007 | Metzger et al. | 294/26 |

FOREIGN PATENT DOCUMENTS

| | | | | | |
|---|---|---|---|---|---|
| JP | 2001321053 | A | * | 11/2001 | A01K 97/14 |
| JP | 2002360122 | A | * | 12/2002 | A01K 97/14 |
| JP | 2011045271 | A | * | 3/2011 | A01K 97/14 |

* cited by examiner

SAFETY GAFF

This application claims the benefit of U.S. Provisional Application No. 60/778,593, filed on Mar. 1, 2006.

BACKGROUND OF THE INVENTION

This invention relates in general to fishing gaffs (as defined below), and in particular to a fishing gaff having a hook that can be selectively folded back upon the gaff's handle thereby blocking the sharp point of the hook in order to prevent injury from inadvertent encounters with the hook point. As used herein the terms "fishing gaff" or "gaff" refer to a steel or comparably strong, generally U-shaped hook having a sharply pointed end, typically barbed, which hook is affixed to generally an elongated handle, and used for landing large fish.

There are obvious advantages to having a gaff with a hook that can be selectively and securely folded back upon the gaff handle to block the hook point. The most significant advantage is that when the hook is securely folded, the chances of someone accidentally being jabbed or scraped by the hook point are reduced to effectively zero. Other advantages include preventing the hook's point from catching on things other than human flesh.

Other advantages and attributes of this invention will be readily discernable upon a reading of the text hereinafter.

SUMMARY OF THE INVENTION

An object of this invention is to provide a gaff with a hook that can be selectively and securely folded back upon the gaff handle to block the hook point.

A further object of this invention is to provide a gaff with a hook having two dispositions, open for gaffing purposes and closed for safety, and a mechanism for securing the hook at both disposition, a finger actuated mechanism for releasing the hook from either disposition, and a bias for urging the hook toward its open disposition.

These objects, and other objects expressed or implied in this document, are accomplished by a fishing gaff including an elongated handle; a pointed fish hook rotatably affixed to one end of the handle, the hook having two dispositions, a first disposition wherein the hook is open for gaffing purposes and a second disposition wherein the hook is folded back against the handle to block the hook point for safety; a mechanism for releasably locking the hook at either disposition; and a finger actuated mechanism for releasing the hook from either disposition. Preferably the gaff further includes a bias for urging the hook toward its open disposition.

DESCRIPTION OF THE PREFERRED EMBODIMENT

Figure 1:
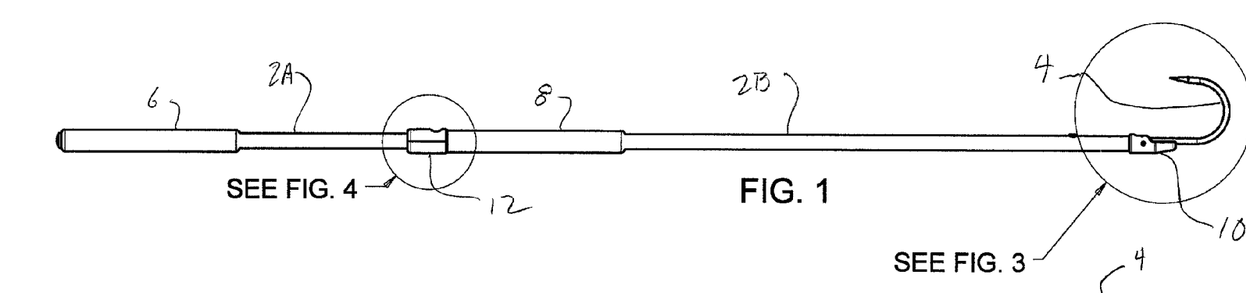
FIG. 1 is a side plan view of a gaff according to this invention with its hook in an open, unfolded disposition.
Figure 2:
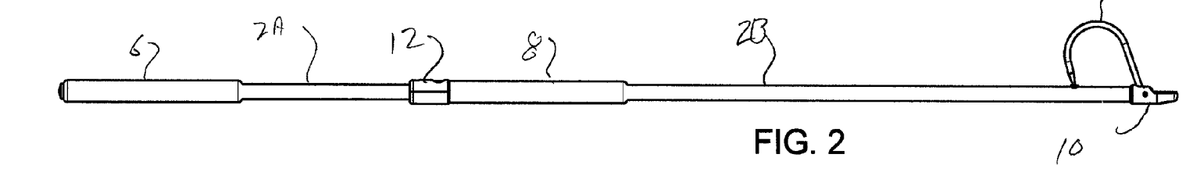
FIG. 2 is a side plan view of a gaff according to this invention with its hook in a closed, folded disposition.
Figure 3:
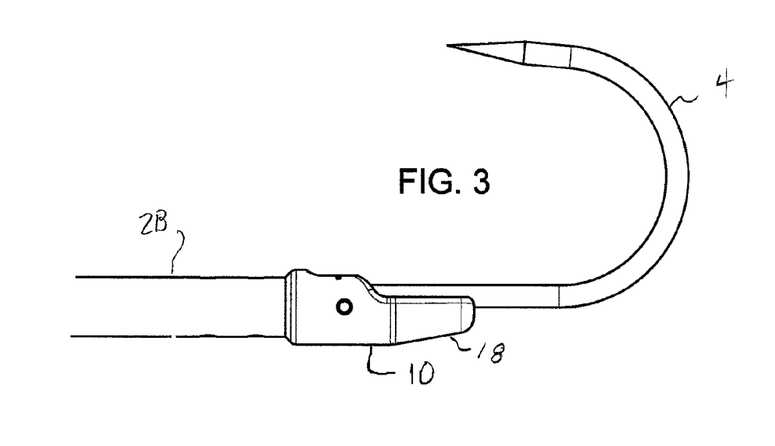
FIG. 3 is a detail view of the hook of FIG. 1.
Figure 4:
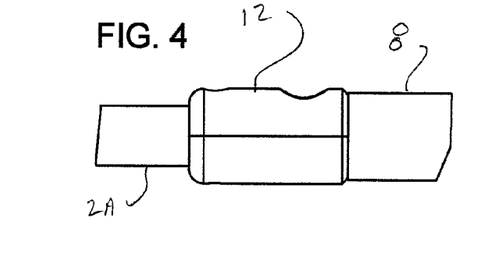
FIG. 4 is a detail view of a pushbutton assembly of FIG. 1.
Figures 5, 6, 7, 8:
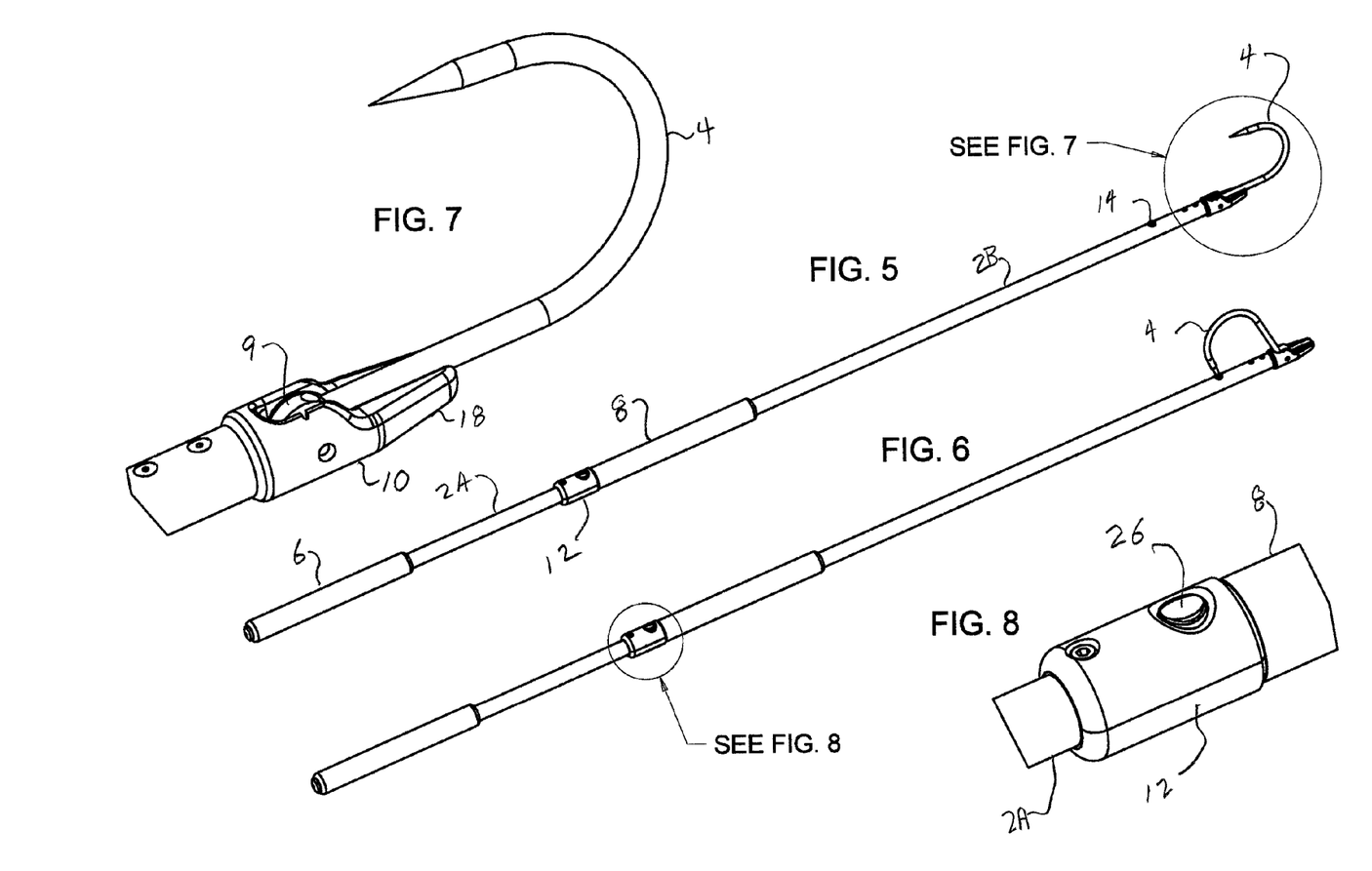
FIG. 5 is a pictorial view of a gaff according to this invention with its hook in an open, unfolded disposition.
FIG. 6 is a pictorial view of a gaff according to this invention with its hook in a closed, folded disposition.
FIG. 7 is a detail view of the hook of FIG. 5.
FIG. 8 is a detail view of a pushbutton assembly of FIG. 6.
Figure 9:
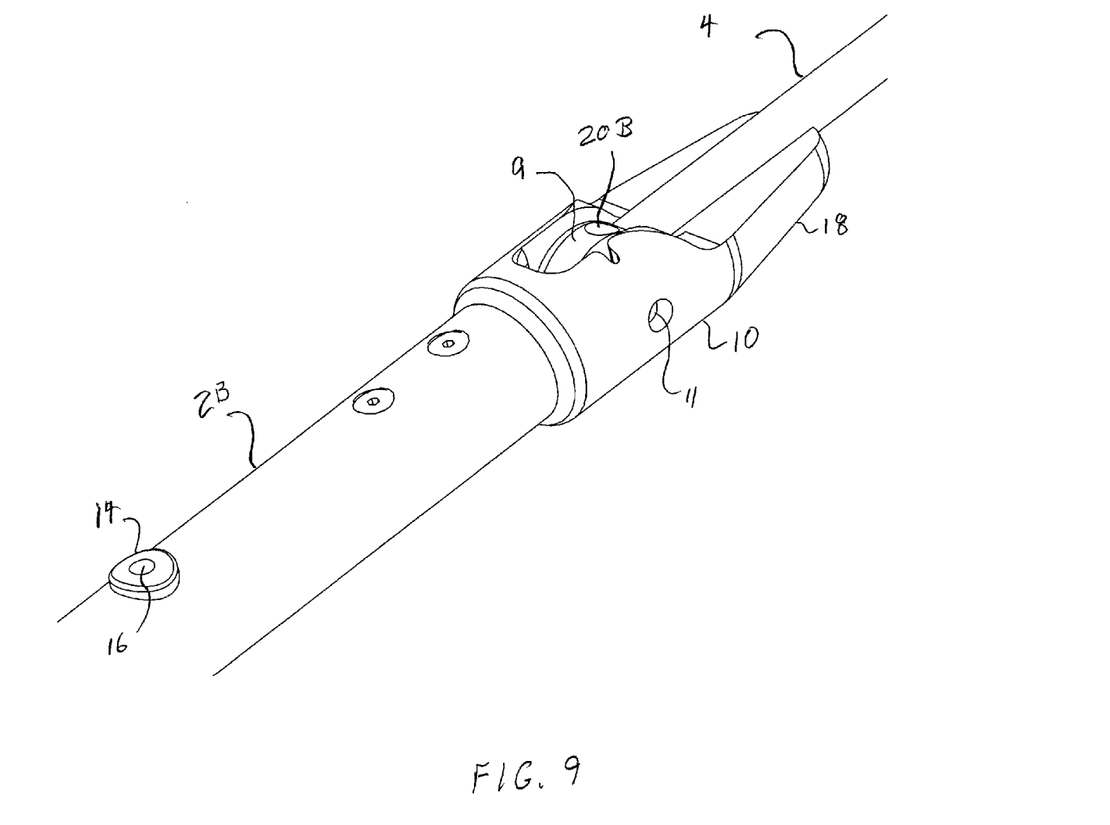
FIG. 9 is a detail view of the shaft head area.
Figure 10:
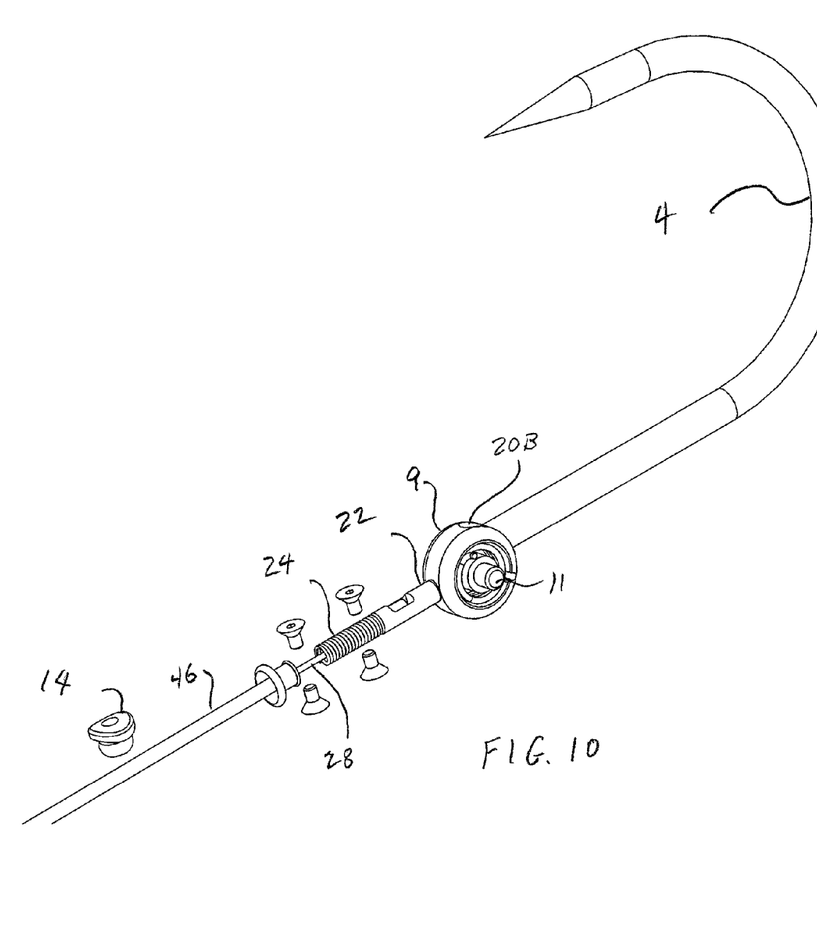
FIG. 10 is a pictorial view of the shaft head area and an open hook minus certain parts for clarity.
Figure 11:
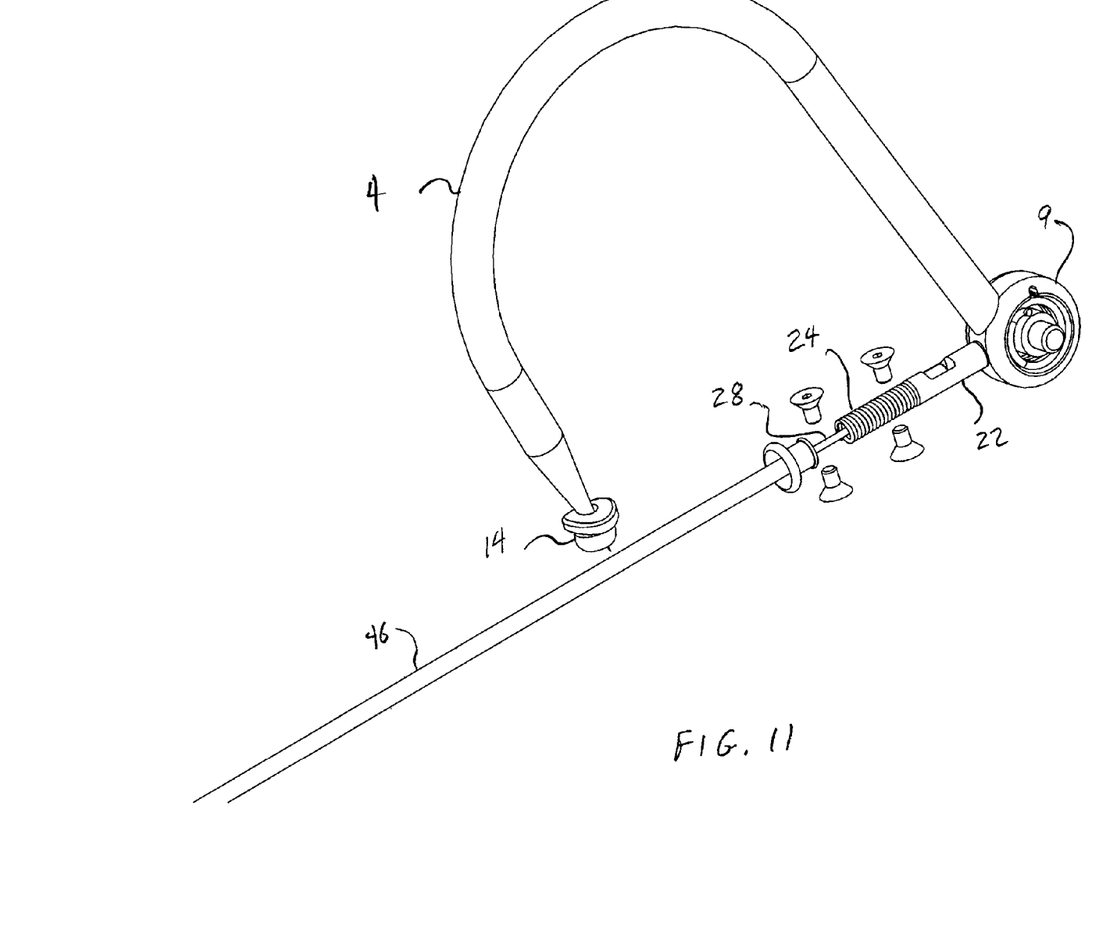
FIG. 11 is a pictorial view of the shaft head area and a closed hook minus certain parts for clarity.
Figure 12:
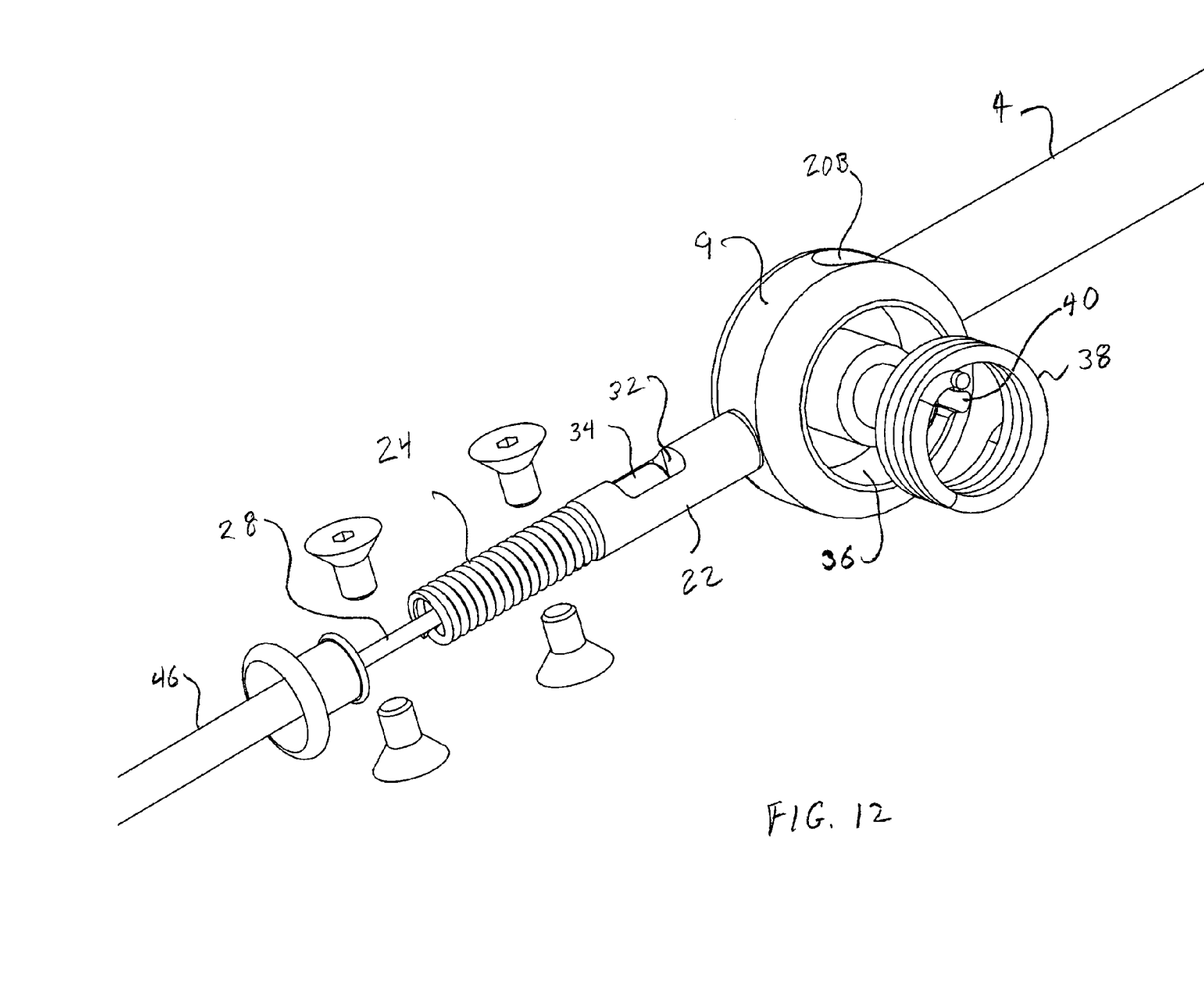
FIG. 12 is a detail view of the hook mechanism with the torsion spring exploded out of the spring hub.
Figure 13:
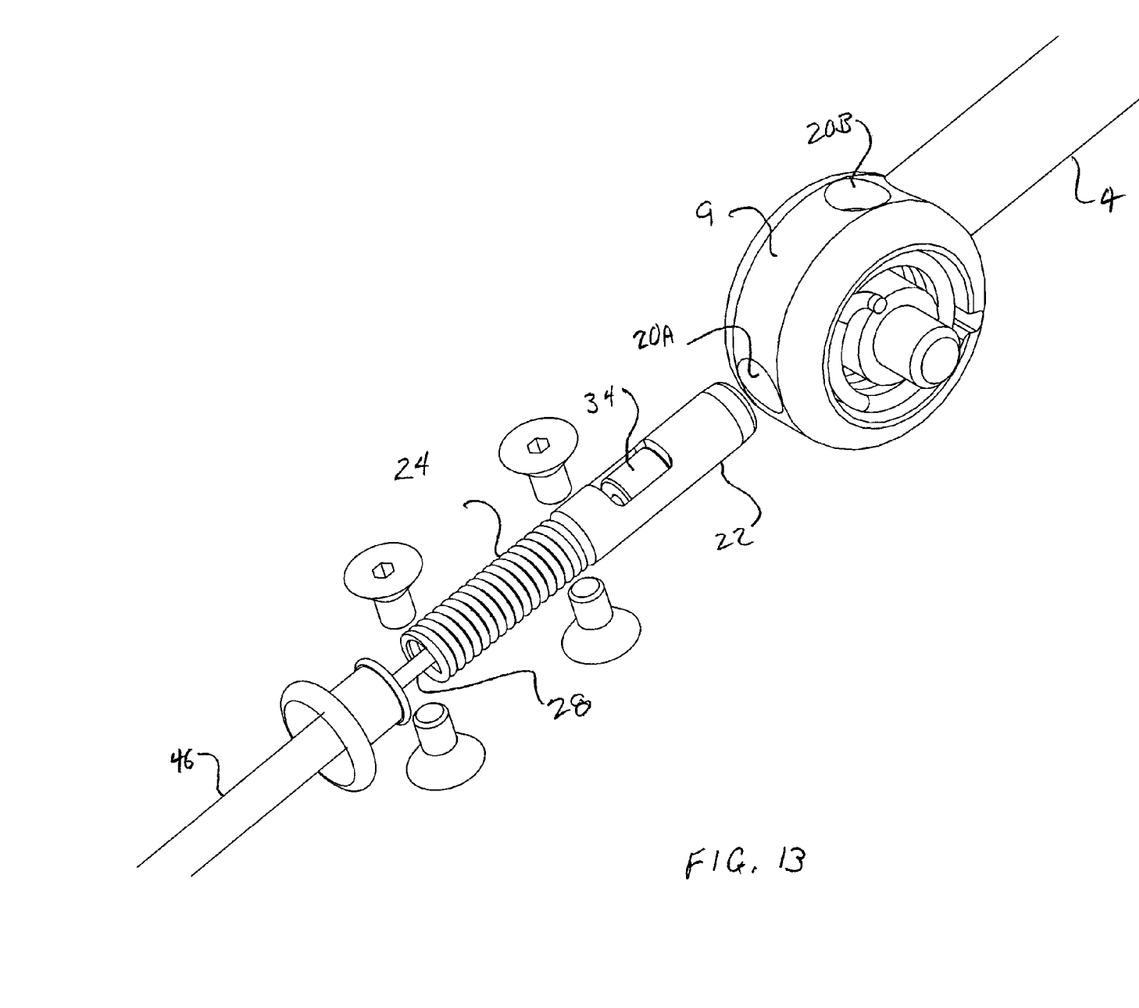
FIG. 13 is a detail view of the hook mechanism with the hook locking pin pulled out of the hub by depression of the pushbutton.

Referring to FIGS. 1-9, a fish gaff according to this invention is illustrated to include an elongated hollow shaft having preferably, but not necessarily, two linearly aligned segments, 2A and 2B, and a fish hook 4 pivotally affixed at a head of the shaft. The shaft also preferably includes two handle grips 6 and 8, a first grip at a foot of the shaft, an end of the shaft opposite the hook, and a second grip intermediate between the first grip and the fish hook. The fish hook is U-shaped with a base end (opposite the pointed end) rigidly affixed to a hook hub 9 that can pivot between a closed disposition (FIG. 2) and an open disposition (FIG. 1) on axle pins 11 rotatingly seated in a hub housing 10 affixed to the head of the shaft. Intermediate the hook and the foot of the shaft is a pushbutton housing 12, which separates the preferable two segments of the shaft. Preferably as illustrated the pushbutton housing is immediately adjacent, foot side, of the second grip 8. As best illustrated in FIGS. 2, 6 and 9, when the hook is in its closed disposition, the hook's point is seated against a resilient, e.g. rubber, pad. Preferably the pad is a grommet 14 having a central hole 16 into which the point sticks. The pad or grommet is affixed in a strategically disposed hole defined by the hollow shaft forward segment 2B. As best seen in FIG. 9, the hub housing 10 includes a forward projecting shoulder 18 that nests the hook when open and braces the hook against forces the hook normally encounters when gaffing.

Referring to FIGS. 10-13 and 17-18, the hub is disc shaped with sufficient thickness to define two spaced radial holes, 20A and 20B, that are sized to receive non-bindingly a locking pin 22 that is axially disposed and biased, preferably by a compression spring 24, toward the rim of the hub. In operation, the pin is only axially movable with respect to the gaff shaft, and when the pin is disposed in either of the hub rim holes, 20A or 20B, the hub, and consequently the hook, is locked in place. The rim holes are strategically disposed to lock the hook in either of the open or closed dispositions but not in between. As will be explained below, the pin is selectively pulled out of the rim holes by a user pushing a button 26 disposed in the button housing 12, and the operative link between the pin 22 and the button 26 is a cable 28, and the pin defines an axial central hole 30 through which a fore end of the cable extends and a swage chamber 32 to accommodate a swage 34 that is crimped to the fore end of the cable to secure the cable fore end to the pin.

Referring again to FIGS. 10-13 and 17-18, the hook hub 9 defines an annular, concentric space 36 into which is disposed a torsion spring 38 one end of which is dogged in a transverse groove defined by the hub within the space 36, the other end of which is dogged in a slot or hole defined by the hub housing 10. The torsion spring is installed so as to bias the hub to align rim hole 20A with the locking pin 22. In other words the spring biases the hook to be in its open disposition.

Figure 14:
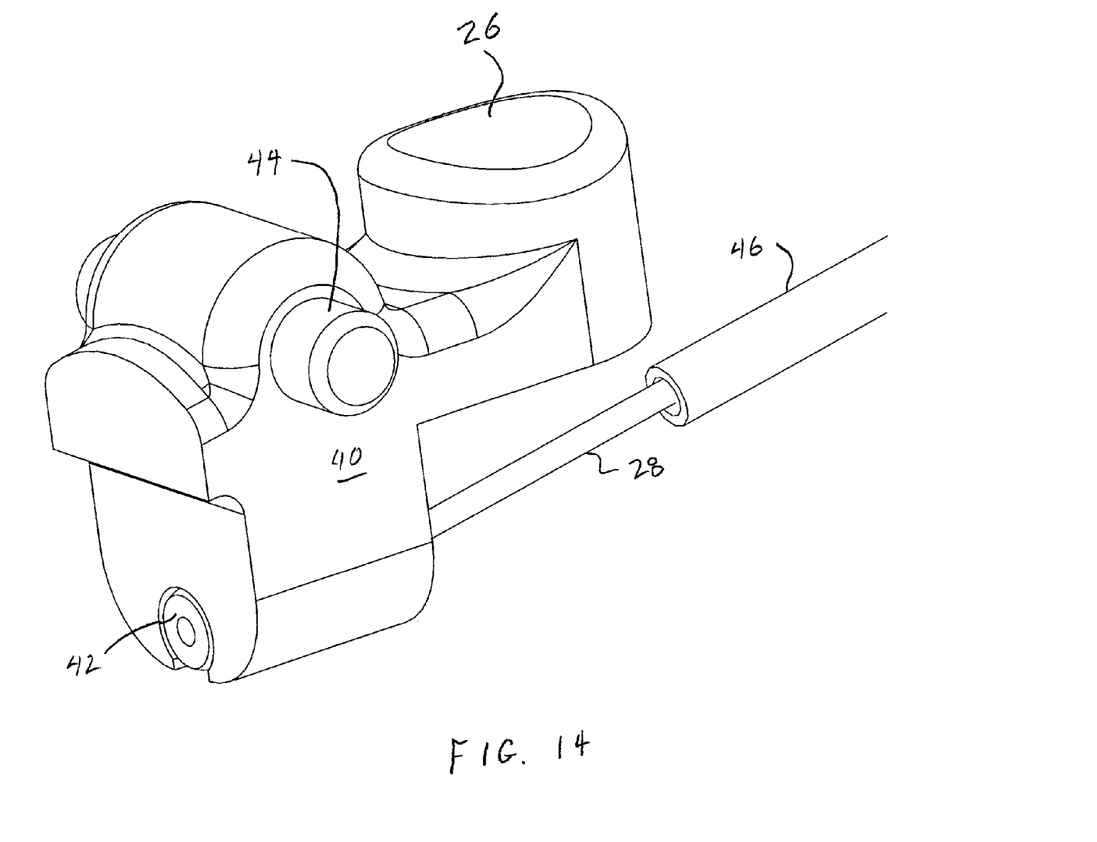
FIGS. 14 and 15 are detail views of the pushbutton outside its housing in a depressed and un-depressed state, respectively.
Figure 15:
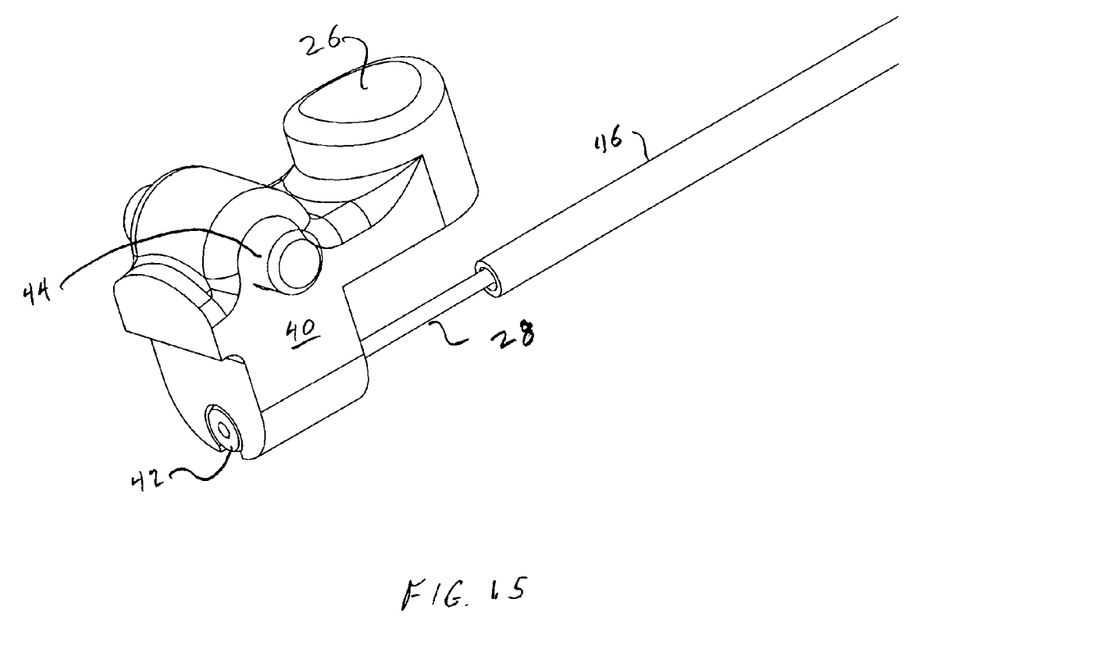
Figure 16:
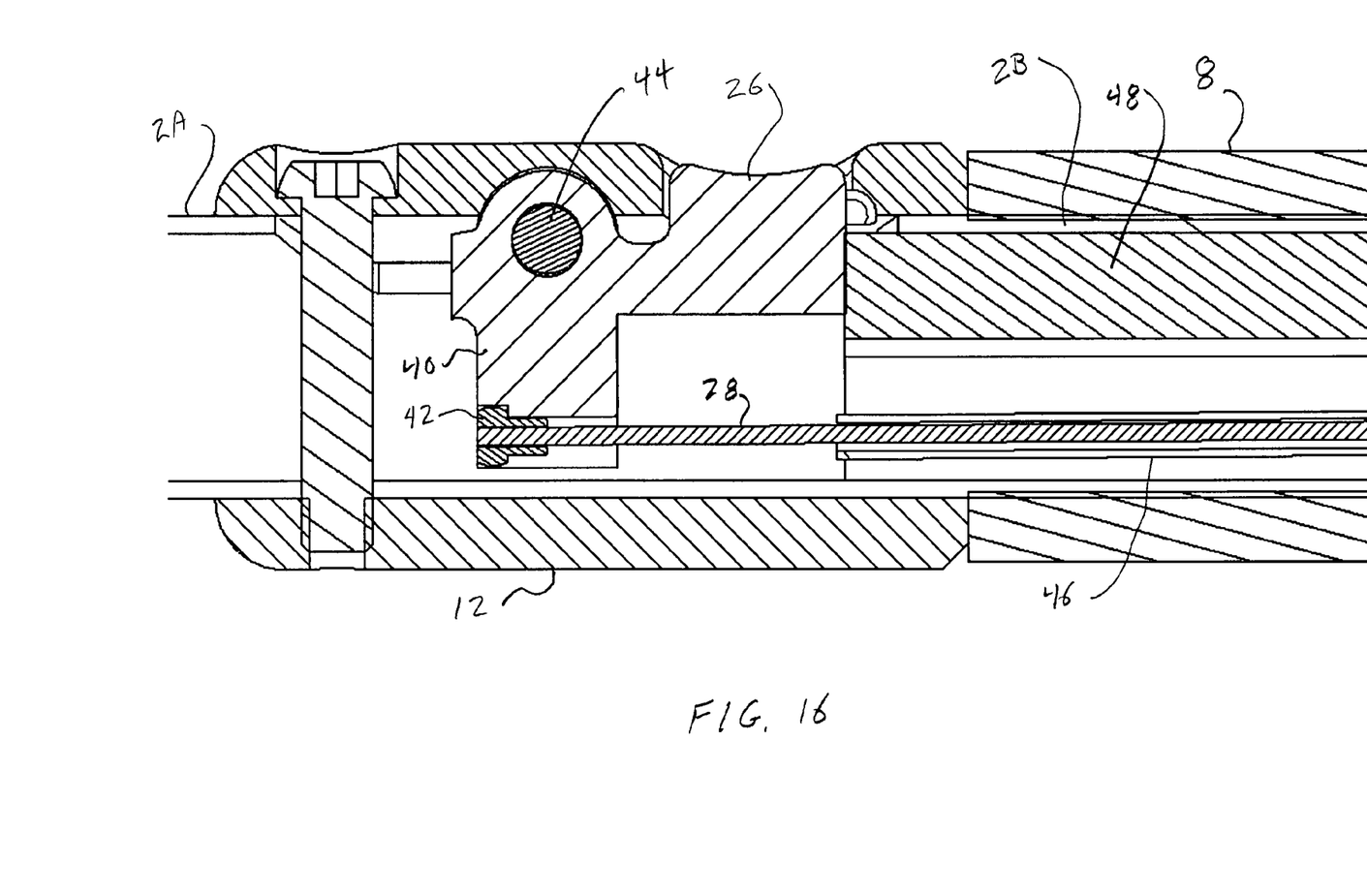
FIG. 16 is a partial cross-sectional view of the pushbutton and surrounding components.
Figure 17:
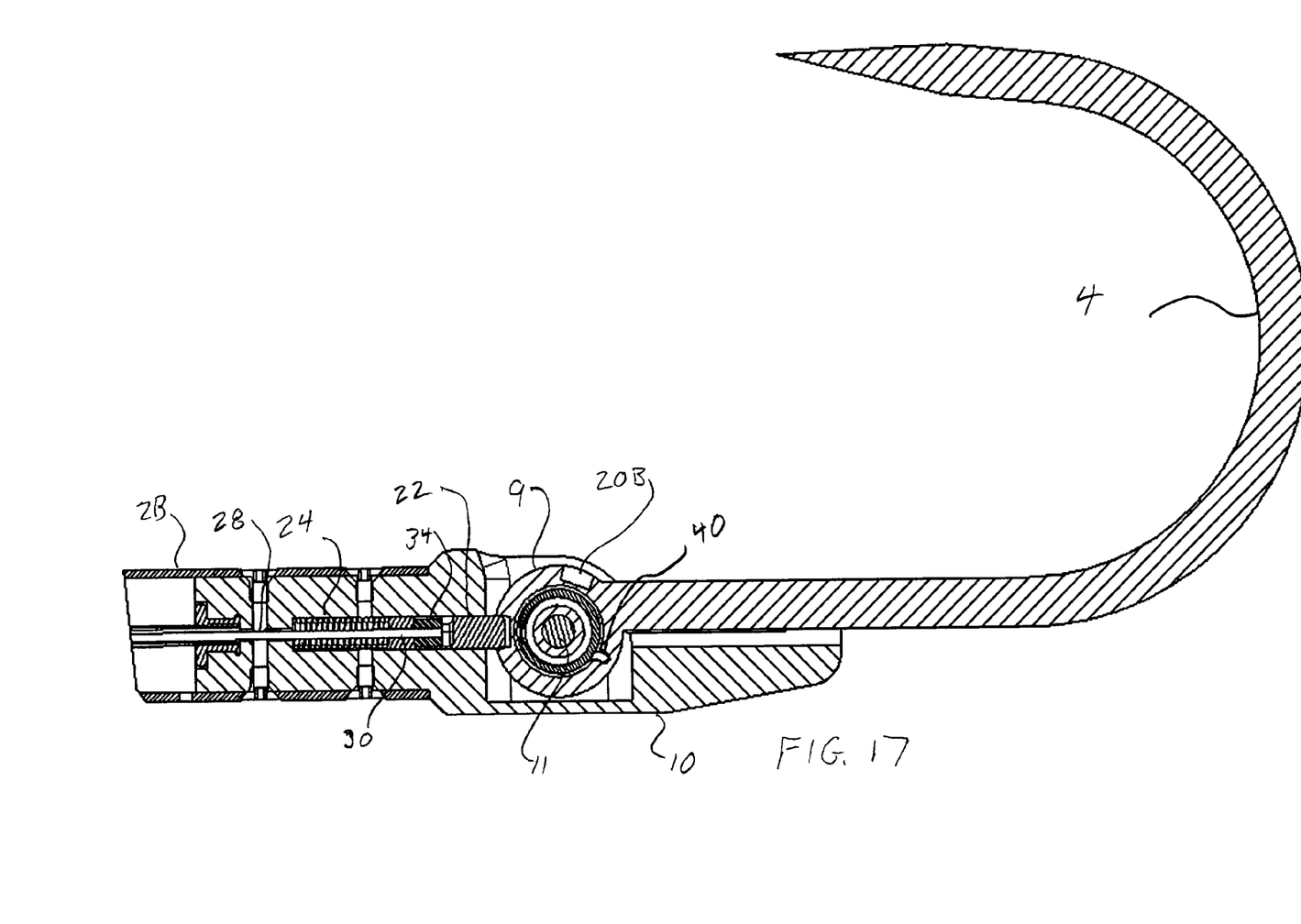
FIG. 17 is a partial cross-sectional view of an open hook and its associated mechanism.
Figure 18:
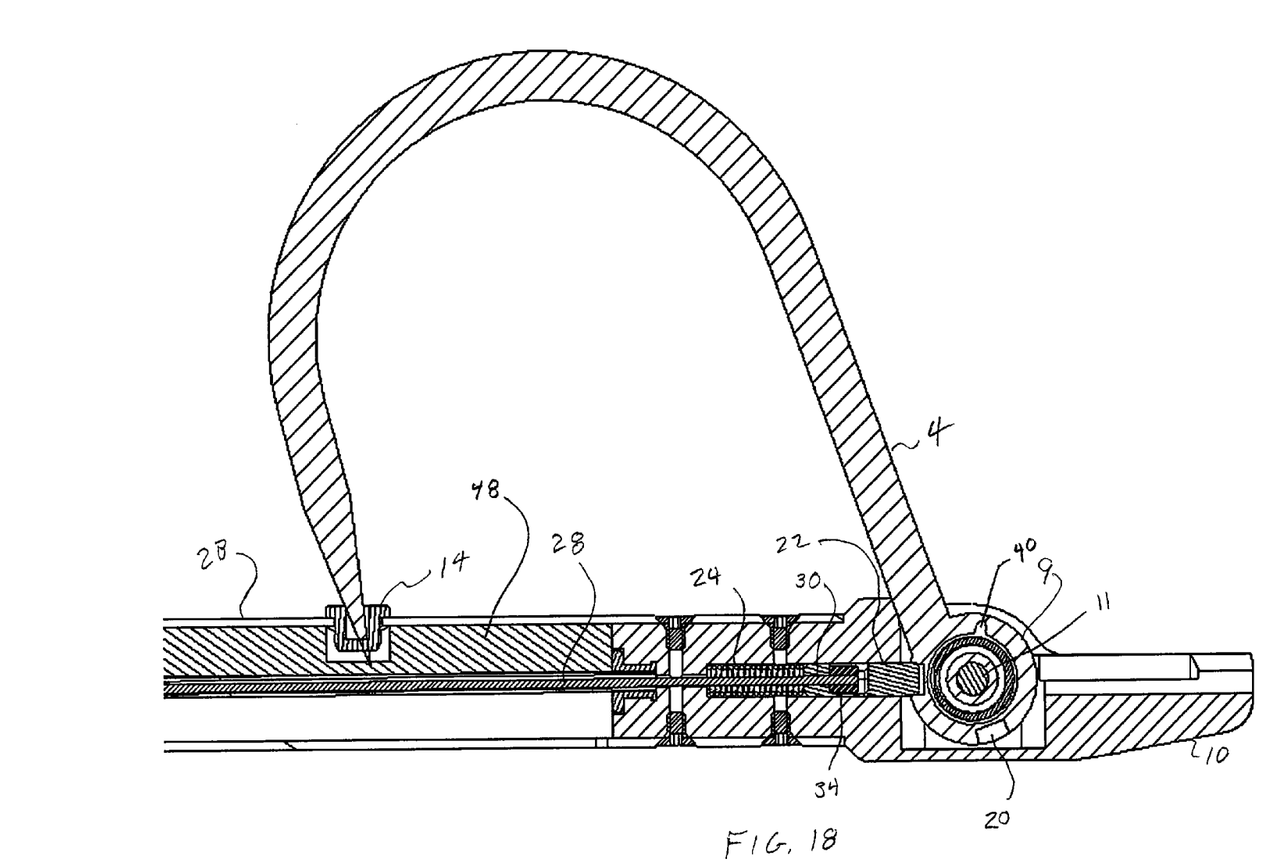
FIG. 18 is a partial cross-sectional view of a closed hook and its associated mechanism.

Referring to FIGS. 8 and 14-16, a pushbutton 26 is illustrated to preferably be an integral part of a L-shaped lever 40 one leg of which is connected to the cable 28 by crimped swage 42 lodged in a hole defined by the leg. The opposite leg is the pushbutton 26, and the lever pivots at the junction of the legs via pin 44 that is rotatingly seated in the housing 12. FIGS. 14 and 15 illustrate the action on the cable when the button is pushed (FIG. 14) and released or not pushed (FIG. 15). As can be seen, when the button is pushed the cable is pulled rearward or in an aft direction. This pulls the pin 22 rearward releasing the hook hub, and the torsion spring causes the hook to rotate to its open disposition. To close the hook, the button is again pushed and the user then forces the hook to close until the hook point is seated in the grommet 14, and the user releases the button which in turn releases the locking pin to seat in hole 20A, thereby locking the hook in the closed position.

Referring to the Figures, the cable preferably has a sheath 46 that is used by inserts 48 in the hollow shaft to guide the cable and to prevent it from swinging against the shaft.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims.

We claim:

1. A fishing gaff comprising:
   (a) an elongated shaft;
   (b) a fish hook including a pointed free end rotatably affixed to one end of the shaft, the hook having first and second dispositions, the first disposition wherein the hook is open for gaffing purposes and the second disposition wherein the hook is folded back against the shaft to block the pointed free end for safety;
   (c) a mechanism for releasably locking the hook at the first and second dispositions;
   (d) a button for releasing the hook from either of the first or second dispositions; and
   (e) a resilient pad where the pointed free end is seated when the hook is in the second disposition;
   (f) wherein the shaft comprises a linear first handle grip affixed to another end of the shaft opposite the fish hook, a second handle grip collinear with the first handle grip and disposed intermediate between the first grip and the fish hook, and an elongated forward shaft segment connecting between the second handle grip and the fish hook, the button being disposed between the first and second handle grips and the pad being affixed to the forward shaft segment.

2. A fishing gaff comprising:
   (a) an elongated shaft defining a hollow;
   (b) a hub rotatably affixed to a head of the shaft;
   (c) a fish hook including a pointed free end and a base end, the base end being affixed to the hub allowing the fish hook to rotate over an area between a first disposition and a second disposition, the first disposition wherein the fish hook is open for gaffing purposes and the second disposition wherein the fish hook is folded back against the shaft to block the pointed free end for safety;
   (d) an automatic locking mechanism for locking the hub in place whenever the hub is at the first or second disposition;
   (e) a pushbutton for unlocking the fish hook to rotate over said area, the pushbutton being disposed rearward of said area;
   (f) a cable operatively connecting the pushbutton to the locking mechanism, the cable being entirely disposed within the hollow of the shaft; and
   (g) a bias urging the fish hook to rotate to the first disposition.

3. The fishing gaff according to claim 2 wherein said bias comprises a torsion spring coaxial with and connected to the hub urging the hub toward the first disposition.

4. The fishing gaff according to claim 2 further comprising two shaft handle grips, a first handle grip at a foot of the shaft and a second handle grip intermediate between the first handle grip and the fish hook, the pushbutton being disposed between the first and second handle grips.

5. The fishing gaff according to claim 4 further comprising a forward shaft segment connecting between the second handle grip and the fish hook, and a resilient pad against which the pointed free end of the fish hook is seated for safety when the fish hook is in the second disposition, the resilient pad being affixed to the forward shaft segment.

6. The fishing gaff according to claim 5 wherein the resilient pad comprises a grommet including a central hole into which the pointed free end of the fish hook sticks.

7. The fishing gaff according to claim 2 further comprising a resilient pad against which the pointed free end of the hook is seated for safety when the fish hook is in the second disposition.

8. The fishing gaff according to claim 7 wherein the resilient pad comprises a grommet including a central hole into which the pointed free end of the fish hook sticks.

9. The fishing gaff according to claim 2 wherein the automatic locking mechanism comprises:
   (a) a locking pin biased toward the hub;
   (b) first and second spaced holes defined by the hub, each of said spaced holes for receiving the locking pin therein, the hub being locked in the first disposition whenever the pin is disposed in the first hole, the hub being locked in the second disposition whenever the pin is disposed in the second hole; and
   (c) wherein the pushbutton comprises a lever pivotally affixed to the shaft and connected to the cable for applying tension to the cable whenever the lever is depressed, the cable pulling the pin from the hub whenever tension is applied to the cable sufficient to overcome the bias of the pin toward the hub; and a finger button for depressing the lever.

10. The fishing gaff according to claim 9 wherein the lever includes two legs in angular relationship, one of the two legs being connected to the cable and another leg of the two legs including the finger button.

* * * * *